(No Model.)
J. B. PRICE.
SURFACE GAGE.
No. 477,960.　　　　　　　　Patented June 28, 1892.
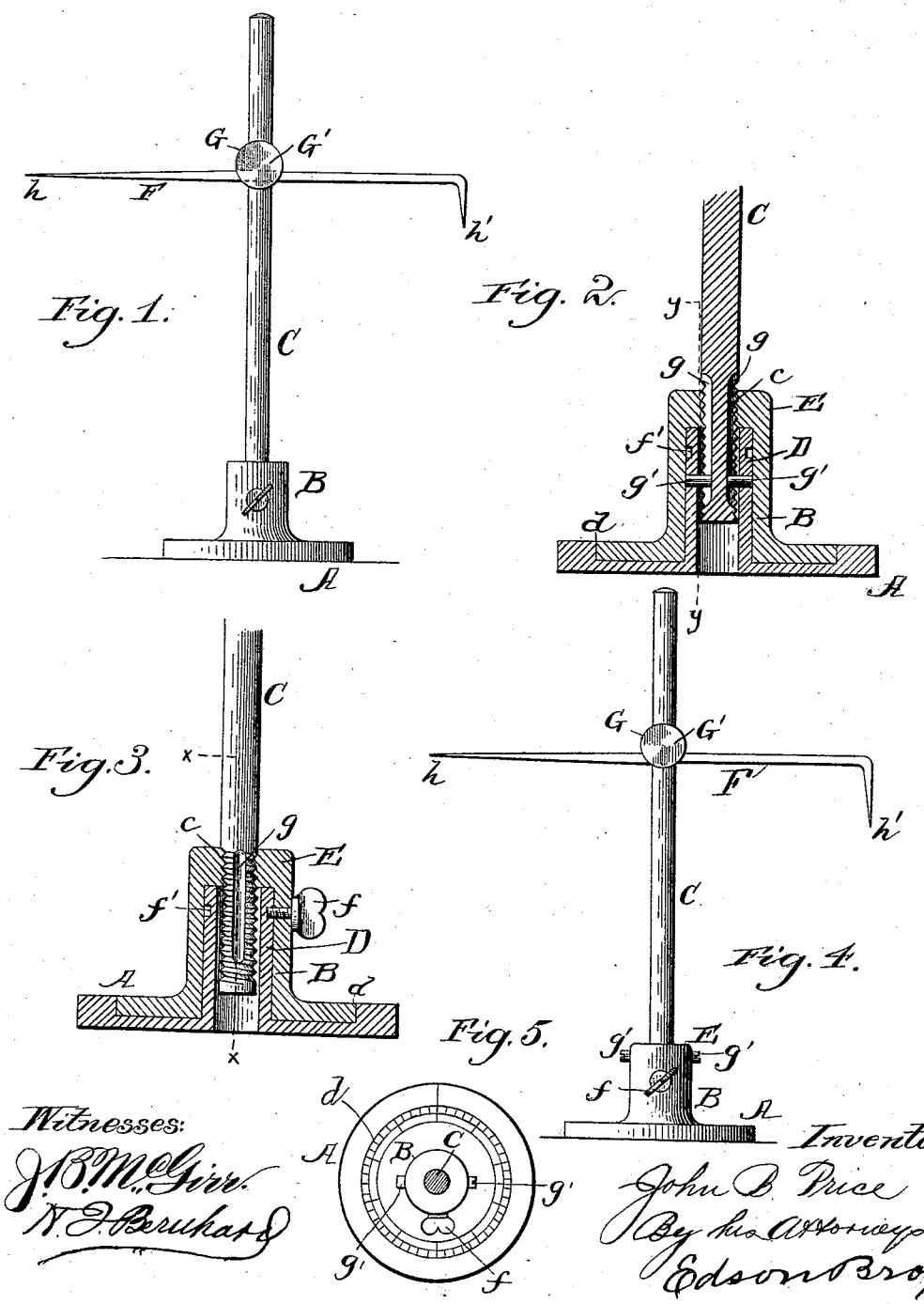
Witnesses:
J. B. McGirr.
N. F. Bernhard.
Inventor:
John B. Price
By his Attorneys,
Edson Bros.

UNITED STATES PATENT OFFICE.

JOHN B. PRICE, OF WOLLASTON, MASSACHUSETTS.

SURFACE-GAGE.

SPECIFICATION forming part of Letters Patent No. 477,960, dated June 28, 1892.

Application filed March 30, 1892. Serial No. 427,112. (No model.)

*To all whom it may concern:*

Be it known that I, JOHN B. PRICE, a citizen of the United States, and a resident of Wollaston, in the county of Norfolk and State of Massachusetts, have invented certain new and useful Improvements in Surface-Gages; and I do hereby declare the following to be a full, clear, and exact description of the invention, such as will enable others skilled in the art to which it appertains to make and use the same.

My present invention relates to surface-gages especially adapted for scribing or marking lines on machine-work parallel with the bed of a planer; and the novelty consists in the combination, with a base having a central boss or socket, of a nut fitted in an annular recess in said base and around the socket thereof, said base and nut being connected to permit of the free rotation of said parts upon each other in a horizontal plane, but without securing vertical adjustment, and a vertical stem splined to the non-rotating part to have vertical movement relatively thereto, which vertical movement is effected by screw-threaded connection between the stem and the rotatable part of the implement.

The invention further consists in the combination and construction of parts, which will be hereinafter fully described and claimed.

In the accompanying drawings, Figure 1 is a side elevation of a surface-gage embodying my invention. Fig. 2 is a vertical sectional view through the base, nut, and lower part of the implement, the section being taken on the line $x\ x$ of Fig. 3. Fig. 3 is a sectional view on a plane at right angles to Fig. 2 and on the plane indicated by the dotted line $y\ y$ of said figure. Fig. 4 is an elevation illustrating another embodiment of my gage in which the nut and stem are connected to be held stationary and the base is adapted to be rotated. Fig. 5 is a plan view of the base and nut, showing the standard in cross-section and the scale on the base.

Like letters of reference denote corresponding parts in all of the figures of the drawings.

A designates the base, B the nut or sleeve, and C the stem, of a surface-gage constructed in accordance with my invention. The base A is preferably made circular in general outline and with a horizontal surface on its lower side. Rising centrally from the base is a tubular stud or boss D, and in the upper side of the base I provide an annular recess $d$. The nut B is made disk-like in form and of a diameter and thickness to fit snugly within the recess $d$ of the base, so that the upper side of the nut is practically flush with the flange of the base and at the same time the base and nut can be freely rotated or turned one upon the other without lateral displacement of the parts. The nut is provided with a central sleeve E, the height of which is somewhat greater than that of the tubular stud on the base, and the internal diameter of said sleeve E is such that the sleeve is adapted to fit snugly around said tubular boss or stud, and the stud D and sleeve E are connected to prevent vertical movement or displacement of the base and nut, while insuring the necessary horizontal rotation of one part upon the other, such connection being effected by a set-screw or pin $f$ of the sleeve fitting in an annular groove $f'$, formed in the stud or boss. I prefer to employ a set-screw, because the base and nut can be rigidly clamped or fastened together after the stem C or scribing-arm has been properly adjusted. The lower end of the vertical stem C is screw-threaded externally, as at $c$, and it is provided with the longitudinal grooves $g\ g$, by means of which the stem can be splined to the non-rotatable part of the gage.

In the preferred embodiment of my invention shown in Figs. 1, 2, and 3 of the drawings I employ a stationary base, so far as horizontal rotation of the parts is concerned in effecting the desired vertical adjustment of the threaded stem, and a rotatory nut. In this construction the threaded end of the stem is screwed into a threaded upper end of the sleeve E of the nut B and the tubular boss or stud D of the base A is provided with fixed pins or studs $g'\ g'$, which fit in the longitudinal grooves $g\ g$ at the lower end of the stem. To manipulate a gage thus constructed, the base A is held stationary or at rest by one hand and the nut B is rotated or turned by the other hand, and this rotary movement of the nut secures the desired vertical adjustment of the stem either up or down, according to the direction the nut is turned, the stem being meanwhile held from rotary or axial movement by the pins $g'$ fitting in the grooves, such spline connection of the stem with the base permitting the endwise adjustment of the stem. I do not confine myself, however, to having the nut rotate and the base splined to the stem, and in Fig. 4 I have shown a construction by which the base can be rotated to adjust the stem while the nut is at rest. The stem is splined to the sleeve E of the nut by means of the pins or screws, which are rigid with the nut and fit in the grooves of the stem, and the lower threaded end of the stem is screwed into the threads provided on the internal surface of the tubular boss or socket of the base.

F is the scribing-arm, having the usual point $h$ at one end and the right-angled point $h'$ at the other end, and this arm is carried by an adjustable support G, which is free to slide up or down on the vertical stem C, the support and the scribing-arm being rigidly clamped in their adjusted positions by means of the set-screw G'.

The operation of my invention will be readily understood by those skilled in the art from the foregoing description, taken in connection with the drawings.

It is evident that changes may be made in the form and proportion of parts and details of construction of the device herein shown and described as an embodiment of my invention, and I hold myself at liberty to make such modifications as fairly fall within the scope of my invention.

What I claim as new is—

1. A surface-gage, substantially as described, consisting of a base provided with a tubular stud or boss, a nut fitted on the base and arranged to turn freely around its stud without displacement thereon, and a stem having its threaded end screwed into one of said parts and splined to the other part, as and for the purpose described.

2. A surface-gage consisting of a recessed base having the tubular central boss or stud, a nut fitted in the recess of said base and having the sleeve which fits around said boss of the base, the groove-and-pin connection between the base and nut to permit one part to turn freely around the other, and a vertical threaded stem splined to the non-rotatable part and having a screw-threaded connection with the rotatable part, substantially as described.

3. The combination of a base provided with the central tubular stud, the internally-threaded nut fitted on the base and connected directly thereto by the pin and groove, and the vertical stem which is externally screw-threaded and grooved at its lower end, the threaded part of the stem working in the threaded part of the nut and the grooves of said stem receiving fixed studs on the base, as and for the purpose described.

In testimony whereof I affix my signature in presence of two witnesses.

JOHN B. PRICE.

Witnesses:
CHAS. F. THAYER,
HENRY J. THAYER.